(12) United States Patent
Ichikawa

(10) Patent No.: US 8,406,517 B2
(45) Date of Patent: Mar. 26, 2013

(54) IMAGE PROCESSING APPARATUS AND IMAGE PROCESSING METHOD

(75) Inventor: Masanori Ichikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/113,185

(22) Filed: May 23, 2011

(65) Prior Publication Data

US 2011/0299767 A1  Dec. 8, 2011

(30) Foreign Application Priority Data

Jun. 3, 2010 (JP) ................................ 2010-128273

(51) Int. Cl.
*G06K 9/36* (2006.01)

(52) U.S. Cl. ...................................................... 382/166

(58) Field of Classification Search .................. 382/162, 382/165, 166, 232–253; 358/1.9, 539; 345/589–604, 536
See application file for complete search history.

(56) References Cited

U.S. PATENT DOCUMENTS

| 6,055,000 | A | * | 4/2000 | Okada | 345/536 |
| 6,369,827 | B1 | * | 4/2002 | Pan et al. | 345/591 |
| 6,647,143 | B1 | * | 11/2003 | Nakashima | 382/166 |
| 8,150,147 | B2 | * | 4/2012 | Tamura | 382/162 |
| 2003/0189576 | A1 | * | 10/2003 | Pan et al. | 345/589 |
| 2011/0123127 | A1 | | 5/2011 | Mima et al. | 382/239 |

FOREIGN PATENT DOCUMENTS

| JP | 2008-271046 A | 11/2008 |
| JP | 2009-221444 A | 10/2009 |
| JP | 2011-71767 A | 4/2011 |

* cited by examiner

*Primary Examiner* — Ishrat I Sherali
(74) *Attorney, Agent, or Firm* — Fitzpatrick, Cella, Harper & Scinto

(57) ABSTRACT

A tile image including a predetermined number of pixels (e.g., 32×32 pixels) is divided into blocks (pieces) of a size of 2×2 pixels each to compare color data of each pixel in each piece. A pattern flag indicating an arrangement pattern of the color data contained in each piece is identified, and first color data and color data other than the first color data in each piece are identified, where the first color data is color data corresponding to a pixel at a predetermined position in each piece. If it is determined that all the pieces, except for a piece consisting of the same color, included in the tile image consist of the same color, the two colors are set to representative colors for reference in the tile image.

8 Claims, 13 Drawing Sheets

FIG. 5

| PATTERN FLAG | IMAGE | 1-2 bit 0 | 1-3 bit 1 | 1-4 bit 2 | 2-3 bit 3 | 2-4 bit 4 | 3-4 bit 5 |
|---|---|---|---|---|---|---|---|
| | | \multicolumn{6}{c}{COMPARISON RESULT} |
| 0 | | 1 | 1 | 1 | 1 | 1 | 1 |
| 1 | | 0 | 1 | 1 | 0 | 0 | 1 |
| 2 | | 0 | 0 | 1 | 1 | 0 | 0 |
| 3 | | 0 | 1 | 0 | 0 | 1 | 0 |
| 4 | | 0 | 0 | 0 | 1 | 1 | 1 |
| 5 | | 1 | 0 | 1 | 0 | 1 | 0 |
| 6 | | 1 | 1 | 0 | 1 | 0 | 0 |
| 7 | | 1 | 0 | 0 | 0 | 0 | 1 |
| 8 | | 0 | 1 | 0 | 0 | 0 | 0 |
| 9 | | 0 | 0 | 1 | 0 | 0 | 0 |
| A | | 0 | 0 | 0 | 0 | 0 | 1 |
| B | | 0 | 0 | 0 | 1 | 0 | 0 |
| C | | 0 | 0 | 0 | 0 | 1 | 0 |
| D | | 1 | 0 | 0 | 0 | 0 | 0 |
| E | | 0 | 0 | 0 | 0 | 0 | 0 |

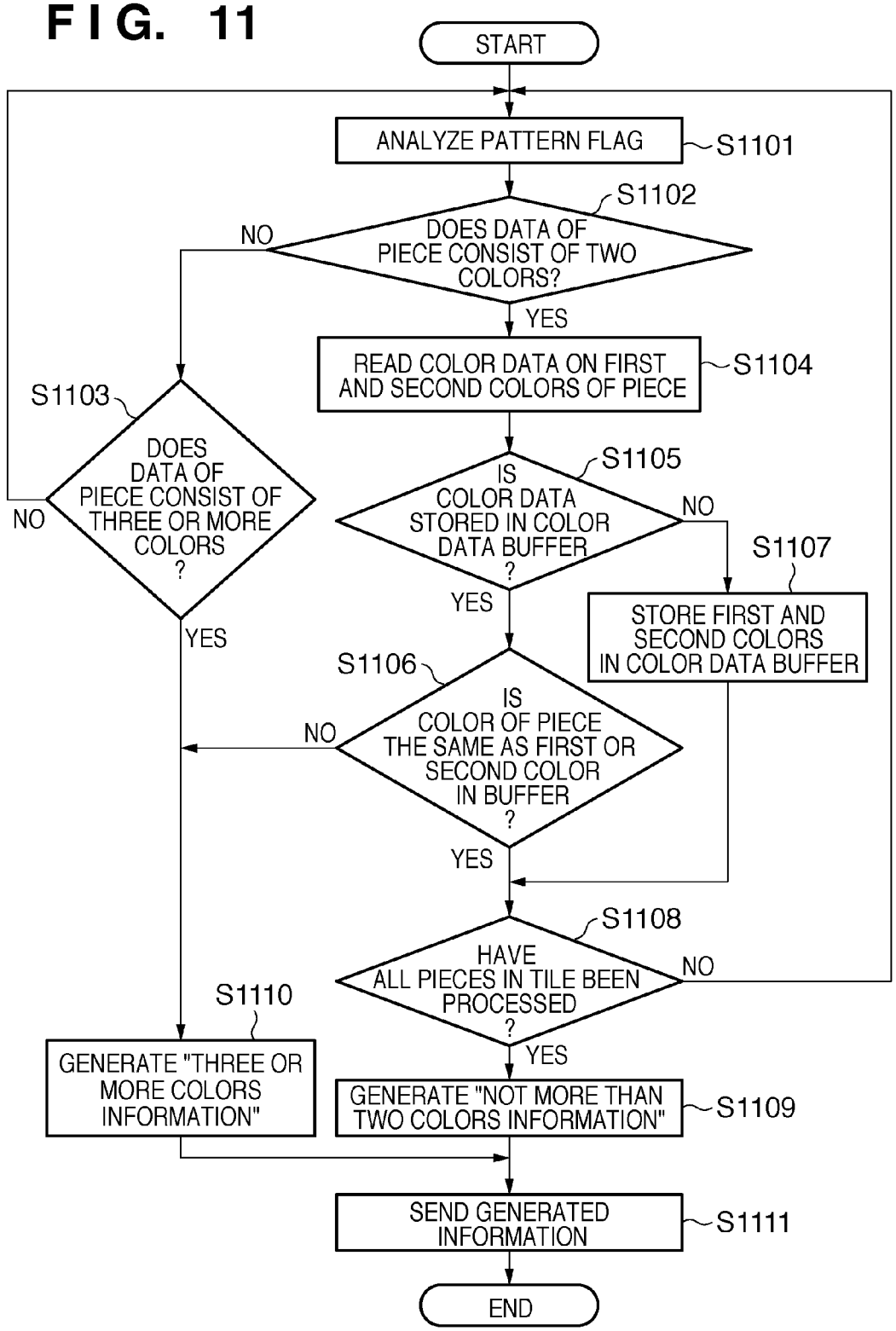

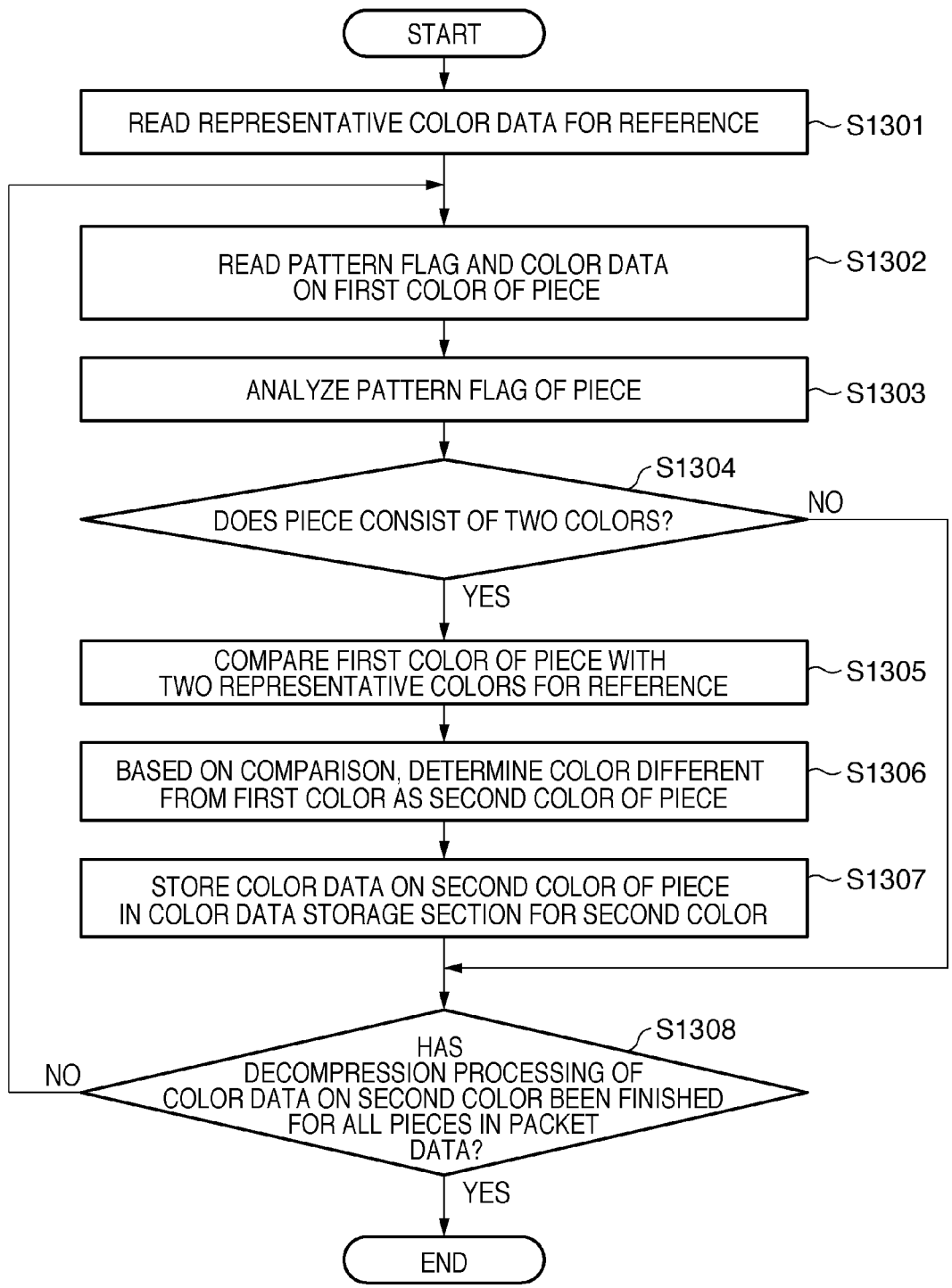

IMAGE PROCESSING APPARATUS AND IMAGE PROCESSING METHOD

BACKGROUND OF THE INVENTION

1. Field of the Invention

The present invention relates to a technique for compressing an image on a predetermined block basis, and a technique for performing image processing and decompression processing for an image compressed on a block basis.

2. Description of the Related Art

There have been great demands for high-resolution color images. In order to meet such requests for the improvement in image quality, digital multifunction peripherals increasingly handle images with 1200 dpi or higher resolutions. With the increase in image resolution, the number of pixels that need to be subjected to image processing is dramatically growing, causing concern of increased load involved in the image processing. For example, doubling the resolution from 600 dpi to 1200 dpi results in quadrupling the number of pixels to be processed. In such digital multifunction peripherals, as well as in image processing apparatuses such as digital cameras and facsimile apparatuses, color image data is compressed in order to save the capacities of memory and a hard disk and to reduce the write time for the memory and the hard disk, thereby realizing cost reduction and speedup.

Compression of color still images often employs JPEG schemes using discrete cosine transform, and schemes using wavelet transform. Generally, these types of coding schemes achieve high compression efficiency by encoding an image on a predetermined block basis (for example, on an 8×8 or 16×16 pixel basis) and performing discrete cosine transform, quantization, and entropy coding. Since these types of coding schemes are variable-length coding schemes, the amount of code varies among encoded images.

With the above image compression, referring to and converting pixel data of compressed data requires decoding the compressed data. That is, image processing cannot be performed for the compressed data as it is, but necessitates decoding processing. Then, all pixels of the high-resolution data need to be processed on a pixel basis. This leads to increased processing time.

As techniques for performing compression processing without encoding pixel data, the following techniques have been disclosed: the known run-length compression scheme, in which pixel data and the number of sequences of the pixel data are stored; and a technique in which compression is performed by detecting an edge on a block basis and storing two colors involved in the edge (for example, Japanese Patent Laid-Open No. 2008-271046).

In the above Japanese Patent Laid-Open No. 2008-271046, the inside of a block is divided into two colors to store shape information on the arrangement of the two colors and color information on the two colors.

For further improvement of image quality and speedup of processing, the applicant has made the following proposal in Japanese Patent Application No. 2009-221444. In this technique, image data is divided into blocks of a size of 2×2 pixels each to compare color data of each pixel in each block. Then, arrangement pattern information on the color data contained in a focus block, and color data information on each color contained in the focus block are output. The output color data information is separated into first color data information corresponding to a pixel at a predetermined position in the block, and other color data information (second to fourth color data information), which are collectively stored in respective memory areas along with the arrangement pattern information. Thus, degradation of the image quality of blocks containing more than two colors is avoided to achieve improved image quality. Also, the thinned-out image data at the specific position is placed as the first color data information in consecutive memory areas, so that a low-resolution image can be handled without decoding. This enables the speedup of processing.

In the above technique, however, the arrangement pattern information, the first color data information, and the other color data information (the second to fourth color data information) are held for each focus block. Accordingly, treating a number of focus blocks as a unit may cause redundancy in the color data.

SUMMARY OF THE INVENTION

The present invention provides an apparatus and a method by which a compression rate in image compression is improved.

According to one aspect of the present invention, there is provided an image processing apparatus, comprising: a dividing unit that divides a tile image including a predetermined number of pixels into pieces of a size of 2×2 pixels each; an identifying unit that identifies a pattern flag indicating an arrangement pattern of color data contained in each piece by sequentially taking each piece divided by the dividing unit as a processing target and comparing the color data of each pixel in the processing target piece, and identifies first color data and color data other than the first color data in each piece, the first color data being color data corresponding to a pixel at a predefined position in each piece; a determining unit that determines whether or not all the pieces, except for a piece consisting of the same color, included in the tile image consist of same two colors; and a generating unit that generates packet data including the pattern flag, the color data on the first color in each piece, and representative colors for reference in the tile image, if the determining unit determines that all the pieces, except for a piece consisting of the same color, included in the tile image consist of same two colors, the representative colors for reference in the tile image being the same two colors.

Further features of the present invention will become apparent from the following description of exemplary embodiments (with reference to the attached drawings).

BRIEF DESCRIPTION OF THE DRAWINGS

FIG. 5 is a diagram showing relationships between four-color patterns in 2×2 pixel blocks and pattern flags;

FIG. 11 is a flowchart that shows a process which determines the number of colors in a constituent color count determining unit;

FIG. 13 is a flowchart showing decompression processing for the color data on the second color in a second-color color data generating unit.

DESCRIPTION OF THE EMBODIMENTS

With reference to the drawings, an embodiment for implementing the present invention will be described in detail below. In the embodiment to be described, a digital multifunction peripheral (MFP) with a number of functions, such as scan, print, and copy, is taken as an exemplary image processing apparatus.

[Configuration of Digital Multifunction Peripheral (MFP)]

Figure 1:
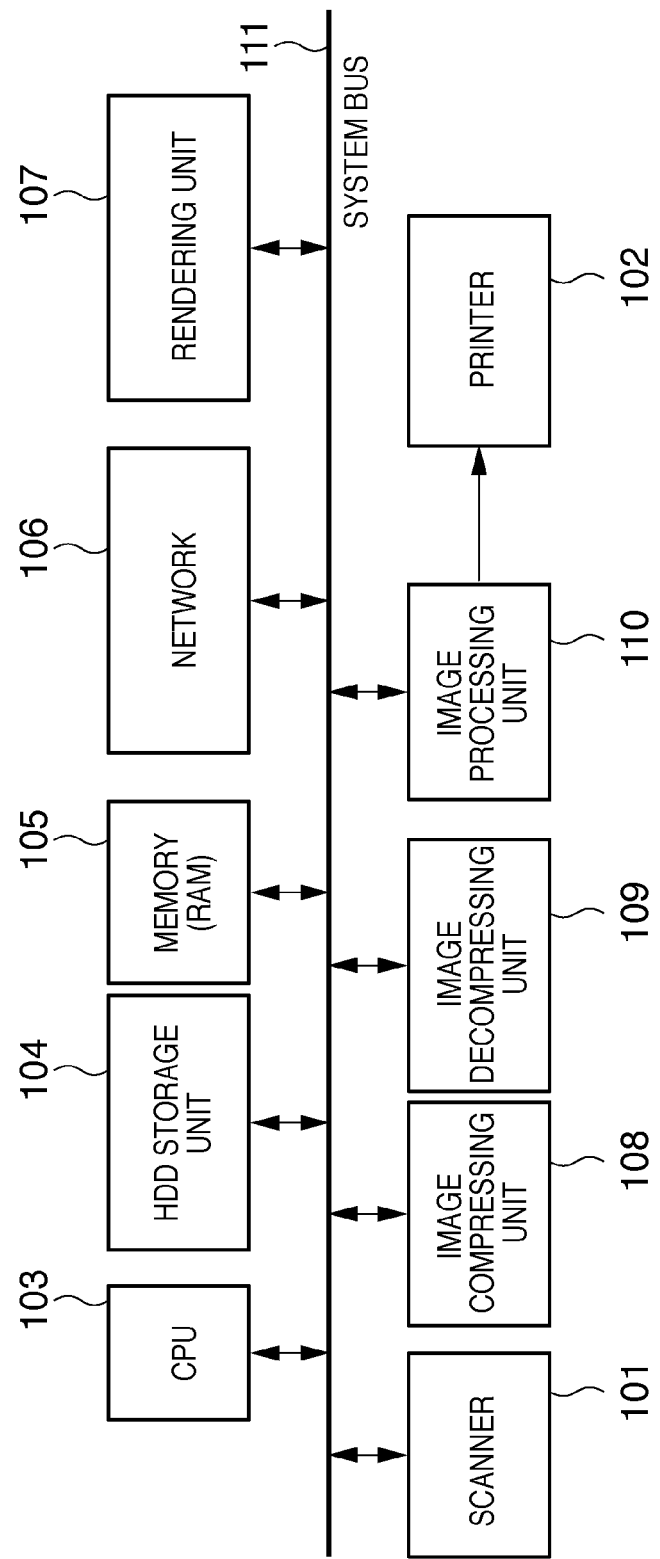
FIG. 1 is a block diagram showing an exemplary configuration of a digital multifunction peripheral.

First, with reference to FIG. 1, an exemplary configuration of the digital multifunction peripheral will be described. A scanner 101 is an image input device of the digital multifunction peripheral. A printer 102 is an image output device of the digital multifunction peripheral. A CPU 103 controls the entire digital multifunction peripheral according to control programs stored in an HDD storage unit 104 to be described. The HDD storage unit 104 may be a hard disk drive, for example, and stores system software, application programs, and image data.

A memory (RAM) 105 is a system work memory used by the CPU 103 in performing processing and is also image memory to temporarily store image data. A network 106 connects with terminals such as a personal computer (PC) and other digital multifunction peripherals over lines such as a LAN and a public line (WAN) to input and output image information and device information. A rendering unit 107 renders page description language (PDL) data received through the network 106 into images.

An image compressing unit 108 performs image compression processing for image data to generate compressed data. An image decompressing unit 109 performs image decompression processing for compressed data to generate decompressed data. The image compressing unit 108 and the image decompressing unit 109 will be further described in detail. An image processing unit 110 performs various sorts of image processing for image data, such as shading processing, filtering processing, color space conversion processing, density adjustment, and gamma correction. The above components are interconnected via a system bus 111.

[Description of Image Processing]

Next, sequential image processing in which the digital multifunction peripheral performs copy operation and print operation will be described. First, sequential image processing in which the digital multifunction peripheral performs copy operation will be described. In this processing, the scanner 101 reads an original image as image data of three colors of RGB. The read image data is sent to the image processing unit 110 via the system bus 111. The image processing unit 110 subjects the image data to image processing for scan, such as shading processing and filtering processing, and sends the image data to the image compressing unit 108. The image compressing unit 108 performs image compression processing for the received image data to convert the image data into compressed data.

The compressed data resulting from the conversion is temporarily stored in the memory 105 and then stored in the HDD storage unit 104. The compressed data stored in the HDD storage unit 104 is again stored in the memory and then sent to the image decompressing unit 109. The image decompressing unit 109 performs image decompression processing for the received compressed data to convert the compressed data into uncompressed image data.

The decompressed image data is transferred from the image decompressing unit 109 to the image processing unit 110, in which the image data is converted from the RGB color space to the CMYK color space through color space conversion processing. Each value of CMYK resulting from the conversion is subjected to color processing, such as density adjustment and printer gamma correction. Further, area tone processing based on dither or error diffusion is performed, and the image-processed data is output to the printer 102.

Next, sequential image processing in which the digital multifunction peripheral performs a print operation according to a job from a PC will be described. The network 106 receives PDL data from the PC via a network interface such as a LAN. The received PDL data is sent to the CPU 103, which also functions as a PDL interpreting unit. The CPU 103 interprets the PDL data and generates a resultant display list. The generated display list is temporarily stored in the memory 105 and then transferred to the rendering unit 107.

The rendering unit 107 renders the display list into RGB image data and transfers the rendered image data to the image compressing unit 108. The image compressing unit 108 performs image compression processing for the received image data to convert the image data into compressed image data. The compressed data is temporarily stored in the memory 105 and then stored in the HDD storage unit 104. Processing after the compressed data is stored in the HDD storage unit 104 can be implemented in the same manner as in the copy processing and therefore will not be described.

[Description of Image Compression Processing]

Next, the image compression processing, which is a feature of the present invention, will be described in detail. This embodiment assumes that the image compressing unit 108 compresses scanned image data in the copy operation, and compresses image data generated from PDL data in the print operation. However, this is not limiting. For example, rather than providing the common image compressing unit as shown in FIG. 1, individual image compressing units may be provided for scanned image data and for image data generated from PDL data, respectively.

In this embodiment, image data on a page basis is divided into blocks of a predetermined size, and then the data compression processing is performed for each of the divided and extracted blocks.

Before detailed description of the image compression processing, it is noted that, in the following description, a "tile" refers to a block of a predetermined number of pixels (32×32 pixels) and a "piece" refers to a pixel block of 2×2 pixels.

Figure 2:
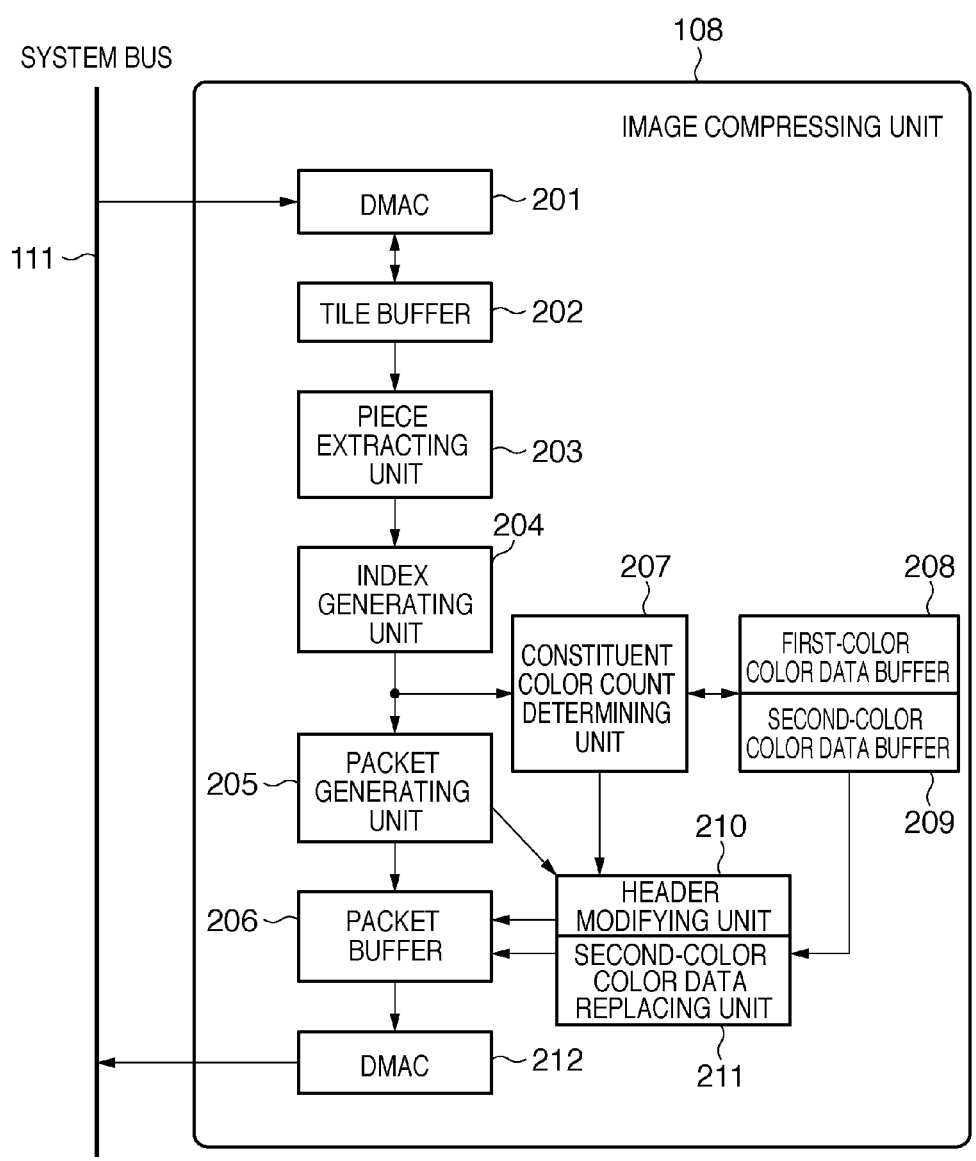
FIG. 2 is a block diagram showing a detailed configuration of an image compressing unit.

With reference to FIG. 2, a detailed configuration of the image compressing unit 108 in this embodiment will be described. A DMAC 201 reads tile images on a tile basis (on a 32×32 pixel basis) from, e.g., the scanner 101, the rendering unit 107, or the memory 105. That is, image data on a page basis is divided into tile images including 32×32 pixels each, and each divided tile image is sequentially read for processing. A tile buffer 202 is temporary storage memory for temporarily storing the tile image read by the DMAC 201. A piece extracting unit 203 extracts image data on a piece basis (on a 2×2 pixel block basis) from the image data of the tile stored in the tile buffer 202. An index generating unit 204 generates the following data for each piece: a pattern flag indicating the arrangement of colors in the 2×2 pixels; color data on a first color, indicating color information at a predetermined position in the 2×2 pixels; and color data on second, third, and fourth colors, indicating color information on remaining colors other than the first color. This embodiment assumes that the predetermined position is the position of the upper-left pixel.

For each tile, a packet generating unit 205 accumulates the pattern flag, the color data on the first color, and the color data on the second, third, and fourth colors, generated for each piece by the index generating unit 204. The packet generating unit 205 further adds predetermined header data of a fixed length to generate packet data. The header data includes information such as a page ID, tile coordinates, color space information, the number of bits of the pixel data, data sizes of the tile, the presence or absence of attribute information, a compression flag, and a two-color flag. The page ID is a unique ID number assigned to each page. The tile coordinates are coordinate information indicating where the tile is located in the raster image of the page. This information describes the coordinates in two dimensions of X and Y coordinates. The color space is information indicating an identifier for identifying whether the tile is an RGB image, a CMYK image, or a gray-scale image. The number of bits of the pixel data is information indicating the bit length per pixel in the tile.

The data sizes of the tile is information in byte indicating the data size of the data on the first color of the tile to be described later, and the data size of the data on the second, third, and fourth colors of the tile to be described later. The presence or absence of attribute information is information indicating whether or not attribute information such as a character or photograph is attached on a pixel basis to the image data. The compression flag is information on a flag indicating whether the tile is compressed data or uncompressed data. The two-color flag is information on a flag indicating whether or not the tile contains not more than two colors and holds color data on the two colors on a tile basis.

A packet buffer 206 is temporary storage memory for temporarily storing the packet data generated by the packet generating unit 205. A constituent color count determining unit 207 counts the number of colors for each tile and determines whether or not the tile consists of not more than two colors. A first-color color data buffer 208 and a second-color color data buffer 209 are temporary storage memory for temporarily storing color data on the colors counted by the constituent color count determining unit 207.

A header modifying unit 210 rewrites the header data stored in the packet buffer 206 based on the result of the determination of the constituent color count determining unit 207. Specifically, if the constituent color count determining unit 207 determines that the tile consists of not more than two colors, the header modifying unit 210 sets the two-color flag to ON (indicating not more than two colors) in the header data. A second-color color data replacing unit 211 clears the color data on the second color stored for each piece in the packet buffer 206, if the constituent color count determining unit 207 determines that the tile consists of not more than two colors. The second-color color data replacing unit 211 further stores, in an area where the cleared color data on the second color was stored, the color data stored in the first-color color data buffer 208 and the color data stored in the second-color color data buffer 209.

Figure 4:
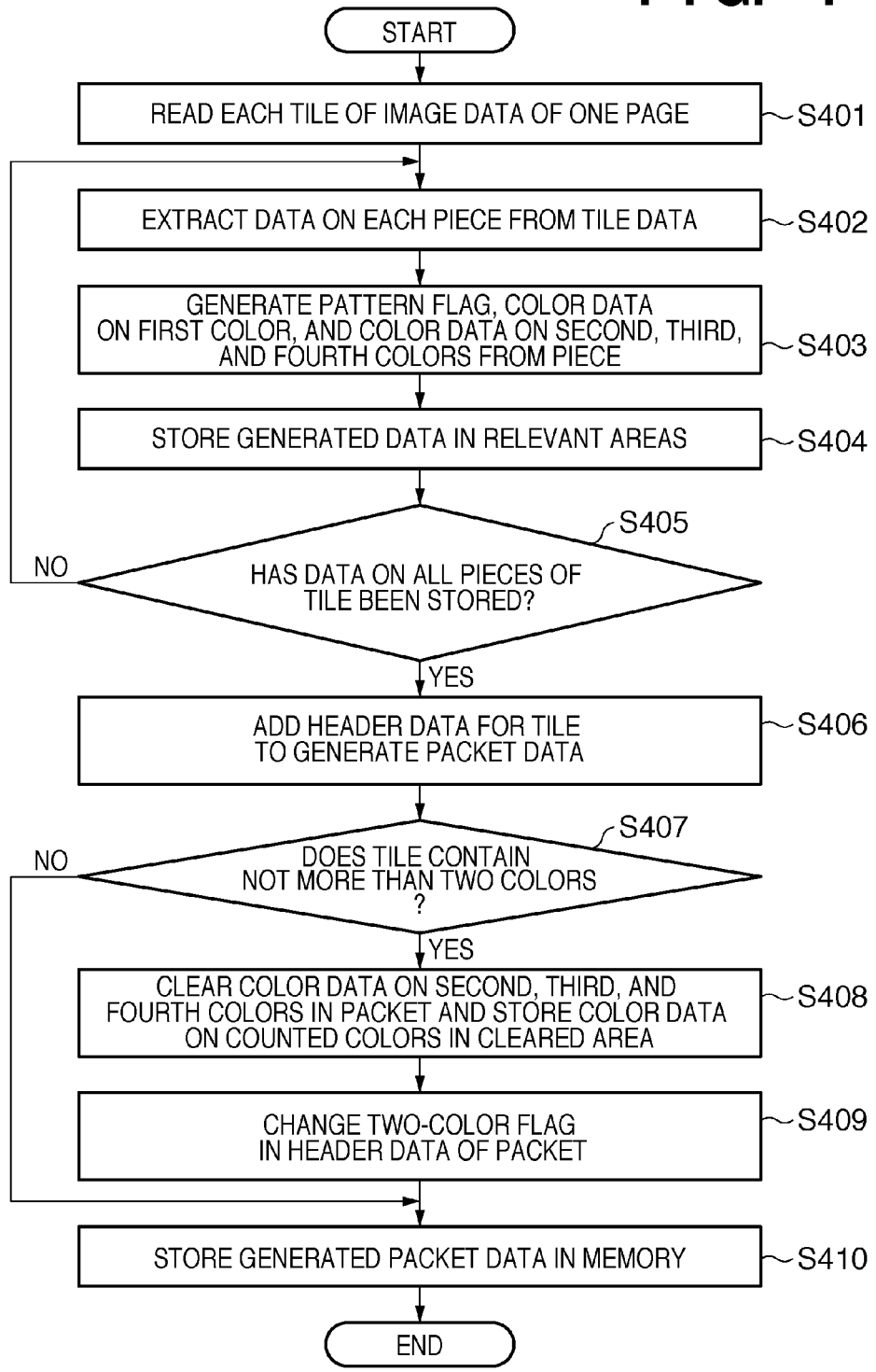
FIG. 4 is a flowchart showing compression processing in the image compressing unit.

With reference to a flowchart of FIG. 4, processing in the image compressing unit 108 including the above components will be described. Description in this embodiment assumes that image data of three colors of RGB generated by the rendering unit is input to the image compressing unit 108. This image data of three colors of RGB consists of, for example, R, G, and B of 256 levels in 8 bits each, and the data represents an image with 24 bits per pixel in an 8-bit data dot-sequential format.

The DMAC 201 divides image data of one page generated by the rendering unit 107 into tiles of 32×32 pixels each and reads the tile data, which is then stored in the tile buffer 202 (S401). From the tile data stored in the tile buffer 202, the piece extracting unit 203 extracts image data of pieces of 2×2 pixels each, which is then output to the index generating unit 204 (S402).

From the image data on each piece, the index generating unit 204 generates the pattern flag indicating the arrangement of colors in the 2×2 pixels, and the color data (S403). The color data here is the color data on the first color indicating color information on the pixel at the predetermined position in the 2×2 pixels, and the color data on the second, third, and fourth colors indicating color information on the remaining colors other than the first color.

Figure 6:
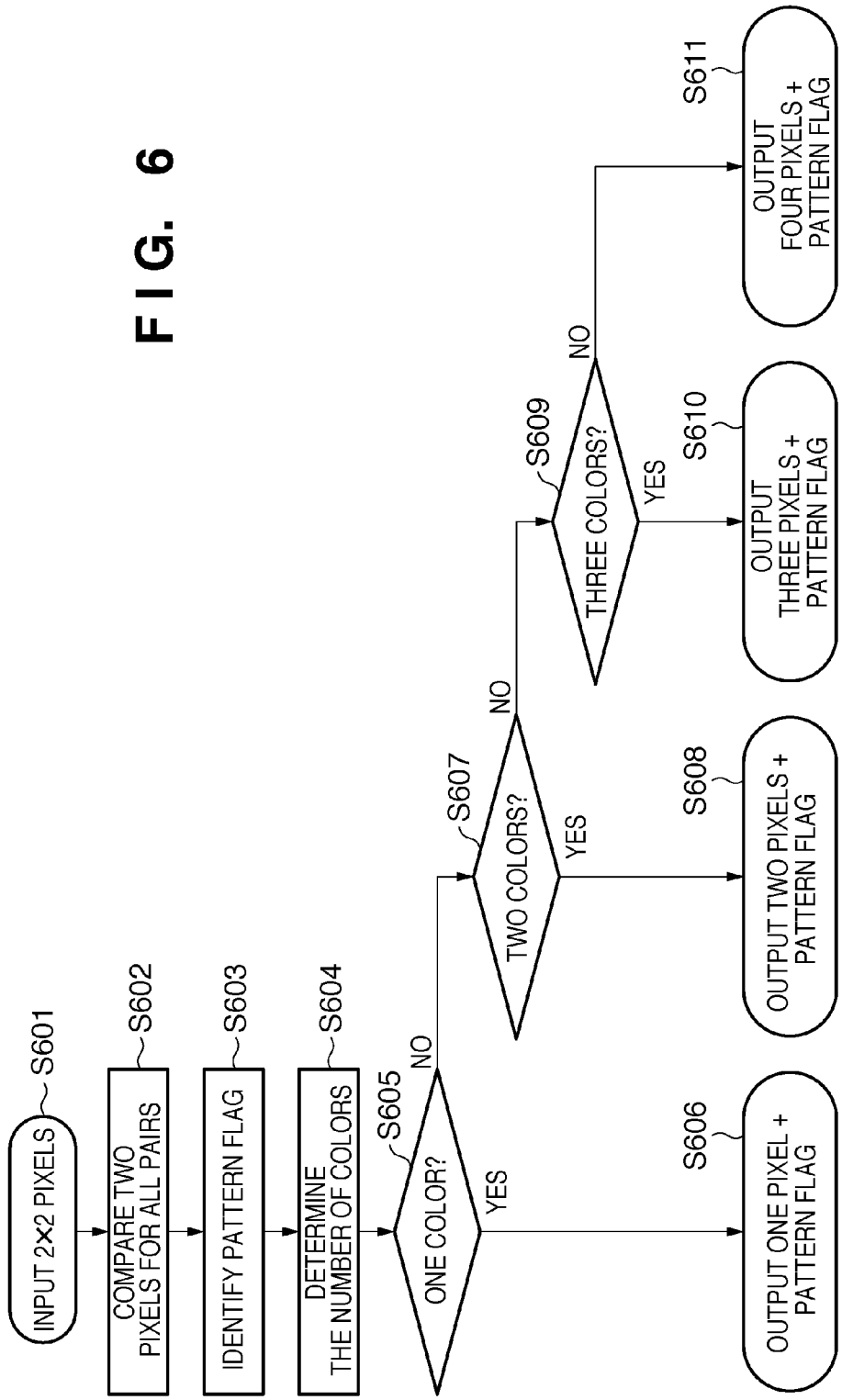
FIG. 6 is a flowchart showing a detailed process in an index generating unit.

With reference to a flowchart of FIG. 6, a detailed process in the index generating unit 204 will be further described. This process determines the color data on each color contained in a piece of 2×2 pixels, and the pattern flag indicating the arrangement of the colors in the piece.

When a piece is input to the index generating unit 204 (S601), the index generating unit 204 compares 24-bit pixel values (24 bits of RGB color data) for all combinations of two pixels in the piece (S602). As a result of the comparison, "1" is output if all the bits match. Otherwise, "0" is output.

Coordinates of the pixels are referred to as 1, 2, 3, and 4 in order of pixel position in the 2×2 pixels at the upper left, upper right, lower left, and lower right (501 shown in FIG. 5). There are six combinations of coordinates of two pixels in total: 1-2, 1-3, 1-4, 2-3, 2-4, and 3-4 (502 shown in FIG. 5), so that six comparisons need to be made and the results are output in 6 bits. As in the comparison results shown in FIG. 5, if the pixel values (color data) of all the pixels in the piece are the same, all the comparison results output "1." Conversely, if all the four pixels have different pixel values, all the comparison results output "0."

In this example, 15 patterns of pixel value (color) matching can occur in the four-pixel block. Accordingly, as shown in FIG. 5, the 4-bit pattern flag is identified depending on the 6-bit comparison result (S603). Then, the number of colors occurring in the four pixels and color data are extracted (S604). As shown in FIG. 5, each pattern indicating the arrangement of the pixel values (colors) in the piece corresponds to a 4-bit pattern flag (or 6-bit comparison result). This allows the number of colors (the number of distinct pixel values) and color data (pixel values) in each piece to be identified.

In FIG. 5 in this embodiment, the color (pixel value) of the upper-left pixel is defined as the first color (first color data) in all the patterns. For the pattern flag "0," the number of colors is one, and the color (pixel value) of the upper-left pixel is extracted as the first color. For the pattern flags 1 to 7, the number of colors is two, and the color (pixel value) of the upper-left pixel is extracted as the first color (first color data). Further, the color (pixel value) of a pixel at a position of the second color (second color data) defined for each pattern flag is extracted. For example, for the pattern flag "1," the color of the upper-right pixel is extracted as the second color (second color data).

For the pattern flags 8 to D, the number of colors in the piece is three, and the color (pixel value) of the upper-left pixel is extracted as the first color. Further, the colors (pixel values) of pixels at positions of the second color (second color data) and the third color (third color data) defined for each pattern flag are extracted. For example, for the pattern flag "8," the color (pixel value) of the upper-right pixel is extracted as the second color, and the color (pixel value) of the lower-right pixel is extracted as the third color. For the pattern flag "E," the number of colors in the piece is four, so that the color of the upper-left pixel is extracted as the first color, the color of the upper-right pixel is extracted as the second color, the color of the lower-left pixel is extracted as the third color, and the color of the lower-right pixel is extracted as the fourth color.

Thus, the number of colors in the piece is identified based on the pattern flag (or the comparison result) (S605, S607, and S609), and the corresponding pattern flag and color data are output (S606, S608, S610, and S611). The data that is output at this point will be described with reference to FIG. 7.

Figure 7:
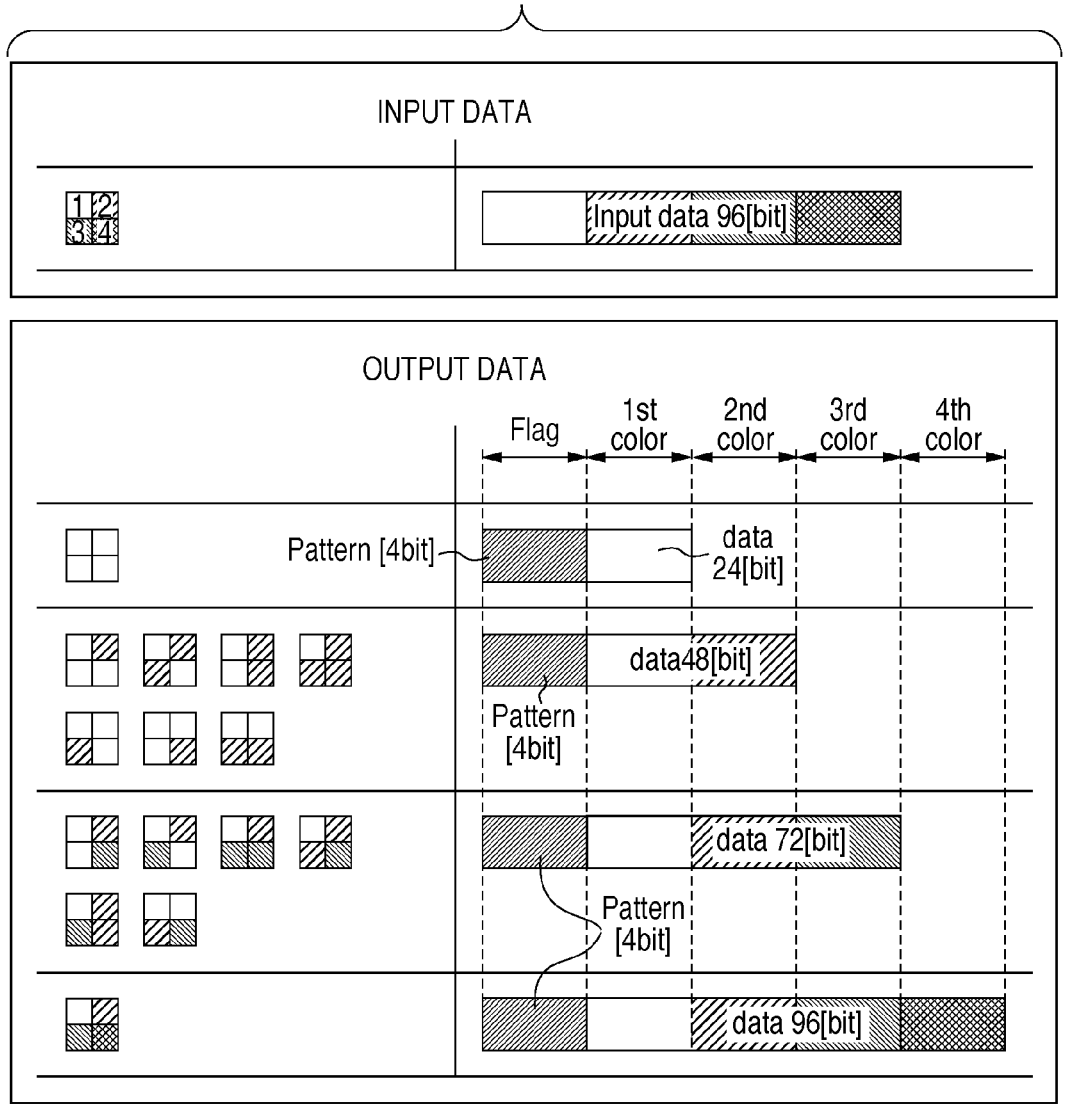
FIG. 7 is a diagram for describing a process of determining the positions of pixels of different pixel values.

As shown in FIG. 7, for example, if the pattern flag is "0" (i.e., the four pixels consist of one color) (YES in S605), the second and further colors do not exist. Then, the 4 bits of the pattern flag and the first pixel value (color data of 24 bits) are output (S606). If the pattern flag is one of 1 to 7 (i.e., the four pixels consist of two colors) (YES in S607), the coordinate of the pixel having the second pixel value is determined from the pattern flag. Then, the 4 bits of the pattern flag and the first and second pixel values (color data of 48 bits (2×24 bits)) are output (S608). If the pattern flag is one of 8 to D (i.e., consists of three colors) (YES in S609), the 4 bits of the pattern flag and the pixel values of the three colors (color data of 72 bits (3×24 bits)) are output (S610). If the pattern flag is E (i.e., four colors) (NO in S609), the 4 bits of the pattern flag and the pixel values of the four colors (color data of 96 bits (4×24 bits)) are output (S611).

In other words, when the color data is output from each piece, it corresponds to that color data occurring for the first time in scanning the piece in order of coordinate (1, 2, 3, and 4 in order of the upper left, upper right, lower left, and lower right) is sequentially output beginning from the first color.

In this manner, from the four-color (96-bit) input data in the piece, the index generating unit 204 generates the 4-bit pattern flag and the data on the pixel values of the colors in the piece. The index generating unit 204 outputs the generated pattern flag and color data to the packet generating unit 205 and the constituent color count determining unit 207.

Figure 8:
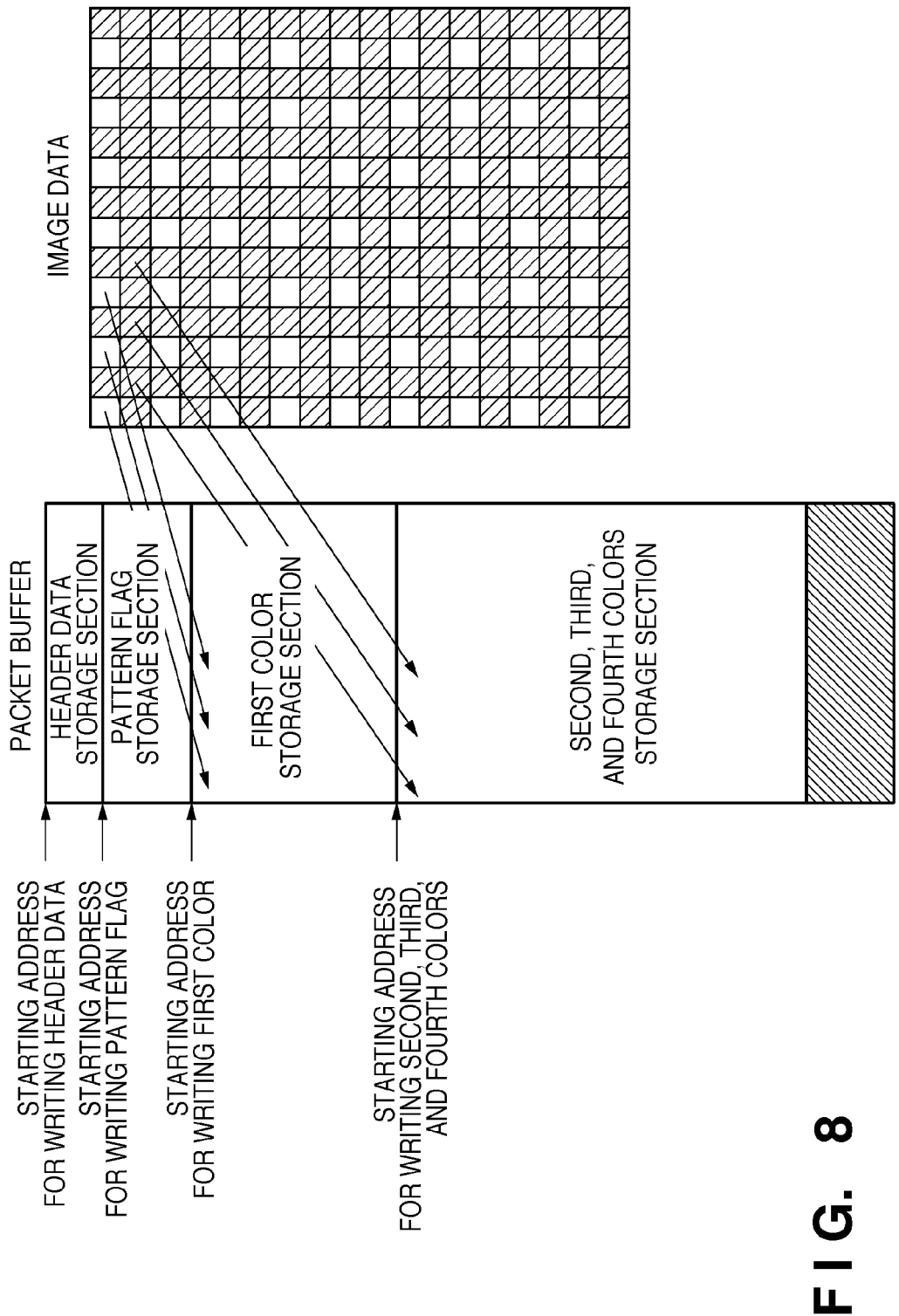
FIG. 8 is a diagram showing an example of writing image data to a packet buffer.

The packet generating unit 205 stores the received pattern flag, color data on the first color, and color data on the second, third, and fourth colors in the packet buffer 206 by varying their memory write areas, so that a data configuration shown in FIG. 8 is obtained (S404). Specifically, the pattern flag determined from each piece is stored in piece order in a pattern flag storage section. The color data (pixel value) on the pixel at the predetermined position (upper left) in each piece is sequentially stored in a first-color storage section. That is, storing the data in the first-color storage section is equal to storing a simply thinned-out low-resolution image. The color data (pixel values) on the second to fourth colors determined from each piece containing the second to fourth colors is sequentially stored in a second, third, and fourth-color storage section. Whether the pieces contain the second to fourth colors depends on the image, so that the data length of the second, third, and fourth-color storage section varies with the image.

Figure 9:
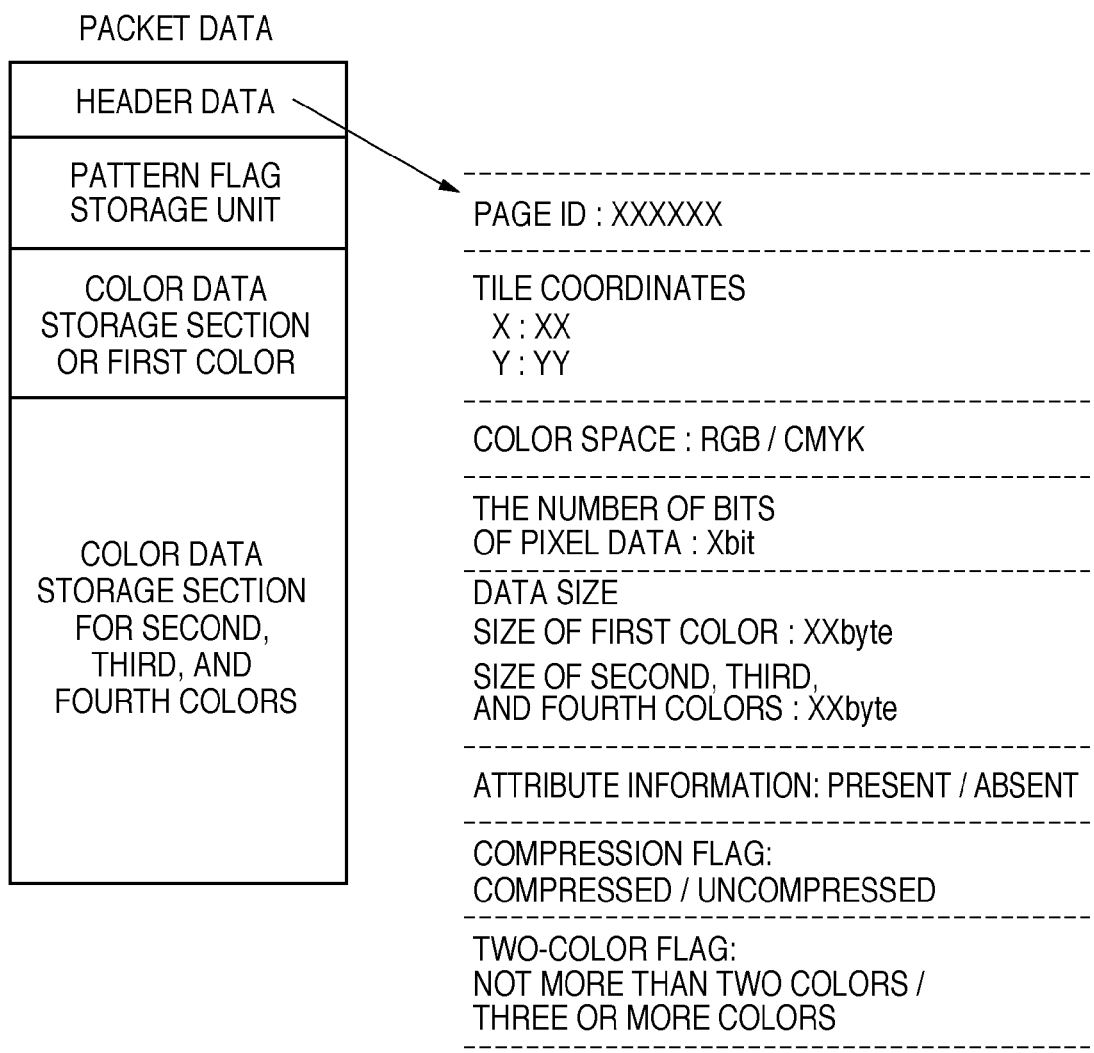
FIG. 9 is a diagram showing a data structure of packed packet data.

It is determined whether or not the data on all the pieces in the tile has been stored in the packet buffer 206 (S405). If not, the process transitions to S402 to proceed to the processing of the next piece. If the data on all the pieces has been stored, the above-described header data is added to generate a packet data as shown in FIG. 9 (S406). At this point, the packet data with the data configuration as in FIG. 8 is generated for each tile image. The packet data in this embodiment is data including the header data and the tile data (see FIG. 9).

The constituent color count determining unit 207 also receives the pattern flag, the color data on the first color, and the color data on the second, third, and fourth colors for each piece from the index generating unit 204. The constituent color count determining unit 207 counts the number of colors for each tile to determine whether or not the tile consists of not more than two colors (S407). Here, the process of determining the number of colors in the constituent color count determining unit 207 will be described in detail with reference to a flowchart shown in FIG. 11. The constituent color count determining unit 207 analyzes the pattern flag of a received first piece (S1101) to determine whether or not the piece consists of two colors (S1102). The relationship between the pattern flag and the number of colors is predefined as shown in FIG. 5. For example, if the pattern flag of the piece is 3, the number of colors is determined as two, and if the pattern flag is 9, the number of colors is determined as three. If it is determined in S1102 that the piece does not consist of two colors, it is further determined whether or not the piece consists of three or more colors (S1103). If it is determined that the piece does not consist of three or more colors, it is determined that the piece consists of one color. For the piece consisting of one color, the color data on the second color for decompression is not needed. The number of colors of the piece is therefore not counted, and the process transitions to S1001 to proceed to the pattern flag analysis of the next piece.

If it is determined that the piece consists of three or more colors, it is determined that the tile that includes this piece contains three or more colors. The constituent color count determining unit 207 generates "three or more colors information" indicating that the tile contains three or more colors (S1110). The generated "three or more colors information" is sent to the header modifying unit 210 and the second-color color data replacing unit 211 (S1111).

If it is determined in above S1102 that the piece consists of two colors, the color data on the first and second colors of the piece is read (S1104). It is then determined whether or not color data is stored in the first-color color data buffer 208 and the second-color color data buffer 209 (color data buffers) (S1105). If color data is stored in these color data buffers, a comparison is made between the color data on the first and second colors of the piece and the color data stored in the color data buffers (color data on the first and second colors) (S1106). If it is determined from the comparison that the color data on at least any one of the first and second colors of the piece is different from both of the two colors stored in the color data buffers, it is determined that the tile that includes this piece contains three or more colors. The constituent color count determining unit 207 generates "three or more colors information" indicating that the tile contains three or more colors (S1110). The generated "three or more colors information" is sent to the header modifying unit 210 and the second-color color data replacing unit 211 (S1111).

If it is determined from the comparison in S1106 that the color data on the first and second colors of the piece is the same as the colors stored in the color data buffers, the process of determining the number of colors for this piece terminates. It is then determined whether the process of determining the number of colors has been finished for all the pieces in the tile (S1108). If it is determined that the process of determining the number of colors has not been finished for all the pieces in the tile, the process transitions to S1101 to proceed to the processing of the next piece. If it is determined that the process of determining the number of colors has been finished for all the pieces in the tile image, it is determined that the tile image contains not more than two colors. The constituent color count determining unit 207 generates "not more than two colors information" indicating that the tile contains not more than two colors (S1109). The "not more than two colors information" is sent to the header modifying unit 210 and the second-color color data replacing unit 211 (S1111).

If it is determined in above S1105 that no color data is stored in the color data buffers, the color data on the first and second colors of the piece is stored in the first-color color data buffer 208 and the second-color color data buffer 209, respectively. The process transitions to S1108 to determine whether the process of determining the number of colors has been finished for all the pieces in the tile (S1108). Subsequent process steps have been described above and therefore are omitted.

In this manner, the constituent color count determining unit 207 determines whether the tile being processed contains not more than two colors or contains three or more colors. As a result of the determination, the constituent color count determining unit 207 sends the "not more than two colors information" or the "three or more colors information" to the header modifying unit 210 and the second-color color data replacing unit 211.

Returning to FIG. 4, if the constituent color count determining unit 207 determines that the tile contains more than two colors (contains three or more colors) in S407, the DMAC 212 stores the packet data generated in steps S402 to S406 in the memory 105 (S410). If the constituent color count determining unit 207 determines that the tile contains not more than two colors in S407, the second-color color data replacing unit 211 clears the color data on the second color stored in the color data storage section for the second, third, and fourth colors in the packet data stored in the packet buffer 206 (S408). Furthermore, the color data in the first-color color data buffer 208 and the color data in the second-color color data buffer 209 are stored in the cleared area as representative colors for reference (S408).

Figure 10A:
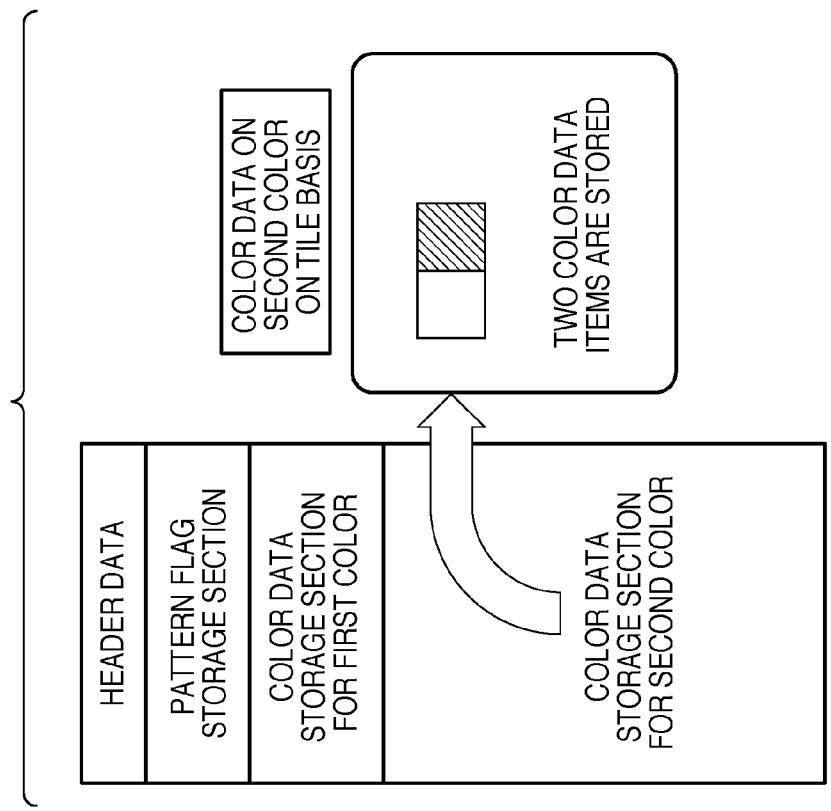
FIGS. 10A and 10B are diagrams for describing how color data on a second color is held.
Figure 10B:
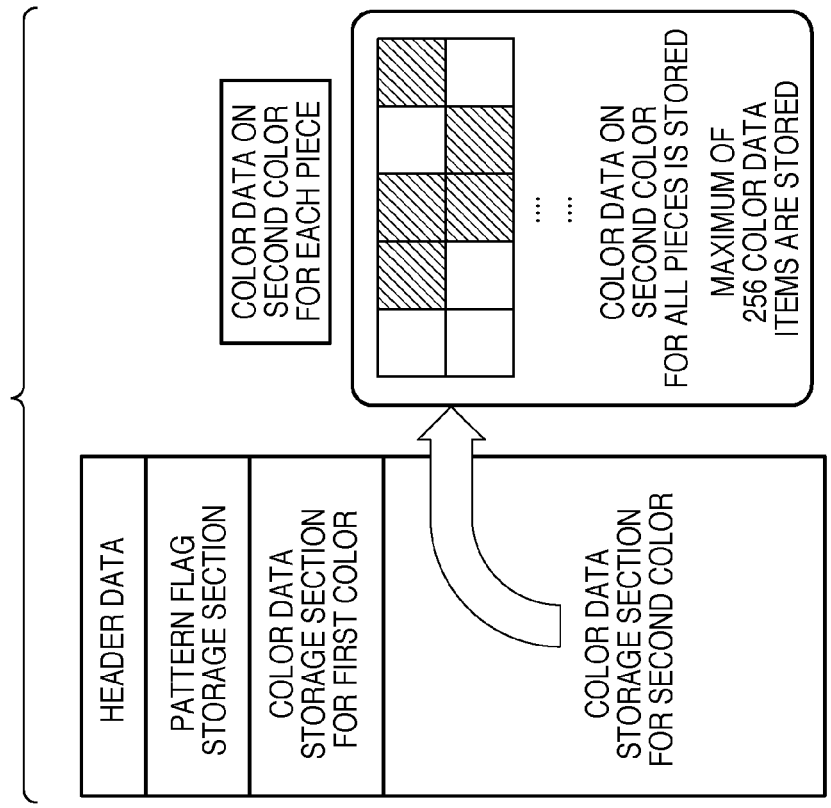

FIGS. 10A and 10B show the change in the color data stored in the color data storage section for the second, third, and fourth colors in the packet buffer 206 before and after the processing in S408. As shown in FIG. 10A, before the processing, the color data on the second color is held for each piece. Since the tile image of 32×32 pixels includes 16×16 (i.e., 256) pieces, a maximum of 256 color data items on the second color are stored in the color data storage section for the second, third, and fourth colors. However, in the processing in S408, the color data on the second color of each piece is all cleared, and the two color data items in the color data buffers are stored as the color data on the second color as shown in FIG. 10B. This means that a maximum of 256 color data items on the second color are reduced to two. In FIG. 10B, the color data on the second color is held on a tile basis.

That is, in the state of FIG. 10A, the color data on the second color has a maximum data size of 768 bytes (256 pieces×3 bytes) corresponding to 256 color data items. However, according to this embodiment, as shown in FIG. 10B, the color data on the second color only requires a data size of 6 bytes (2×3 bytes) corresponding to the two color data items. Hereinafter, the two color data items held on a tile basis is referred to as representative color data for reference.

The header modifying unit 210 changes the value of the two-color flag in the packet buffer 206 to 1 (ON) (S409). In this embodiment, the two-color flag with the value 1 means that the packet data contains not more than two colors, and that the color data on the two colors is held on a tile basis. The two-color flag is initially set to the value 0. As a result, if all the pieces, except for a piece consisting of the same color, included in the tile image consist of two colors, the two-color flag in the header data is set to ON, and the pattern flag indicating the arrangement of the colors in each piece is stored in the pattern flag storage section. In the generated packet data, the color data on the pixel (the upper-left pixel) at the predetermined position in each piece is stored in the color data storage section for the first color as the color data on the first color, and the representative color data for reference (the two color data items) is stored in the color data storage section for the second color. The DMAC 212 stores the modified packet data in the memory 105 (S410).

By applying the above processing to all the tile data of the page, the compression processing is performed for the image data. For a tile consisting of two colors, the color data on the second color of each piece is replaced with the two representative colors for reference on a tile basis. This provides an improved compression rate.

[Description of Image Decompression Processing]

Figure 3:
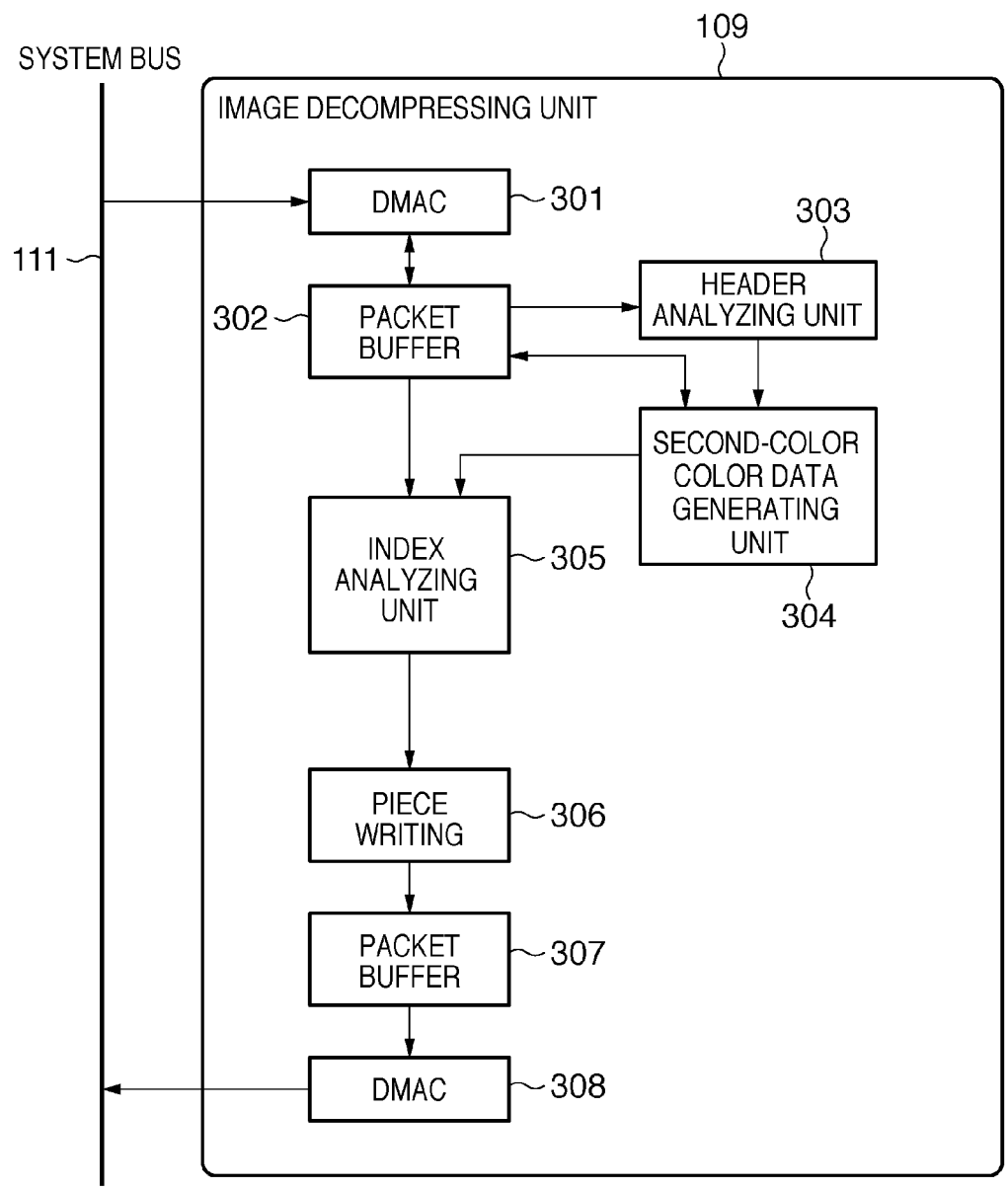
FIG. 3 is a block diagram showing a detailed configuration of an image decompressing unit.

Now, the image decompression processing for compressed data by the image decompressing unit 109 will be described in detail. With reference to FIG. 3, a detailed configuration of the image decompressing unit 109 in this embodiment will be described. A DMAC 301 reads compressed data from e.g., the memory 105 on a packet basis. A packet buffer 302 is temporary storage memory for temporarily storing, on a packet basis, the compressed data read by the DMAC 301. A header analyzing unit 303 reads the header information of the packet data stored in the packet buffer 302 and analyzes the two-color flag in the header information. A second-color color data generating unit 304 performs processing of generating the color data on the second color for each piece in the packet data based on determination of the header analyzing unit 303.

An index analyzing unit 305 decompresses piece data based on the pattern flag, the color data on the first color, and the color data on the second, third, and fourth colors, which are input for each piece. A piece writing unit 306 receives the decompressed piece data and stores the piece data in predetermined areas in a packet buffer 307 as shown in FIG. 8. The packet buffer 307 is temporary storage memory for temporarily storing the decompressed packet data. The DMAC 308 transfers the packet data stored in the packet buffer 307 to a component such as the image processing unit 110.

Figure 12:
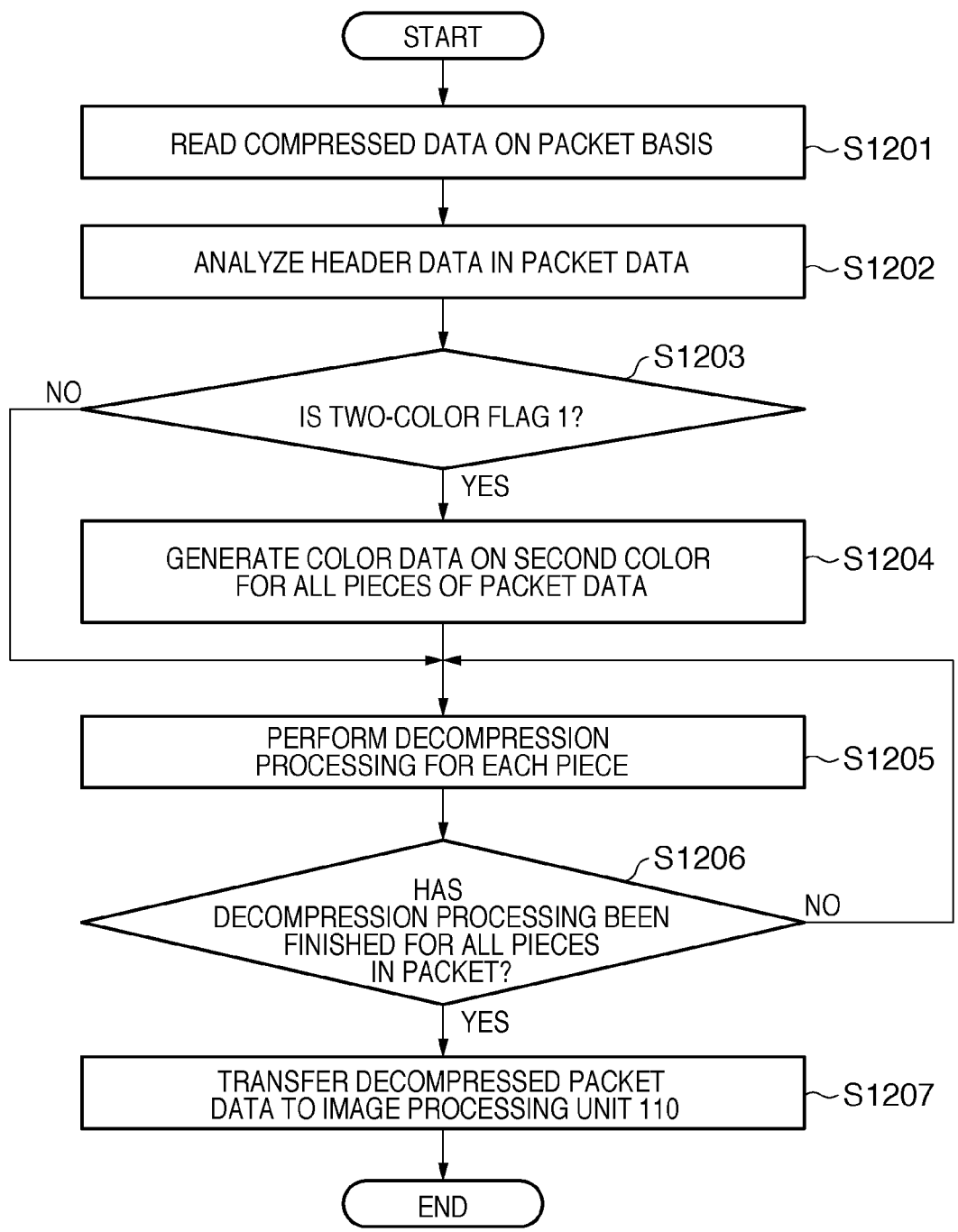
FIG. 12 is a flowchart showing decompression processing in the image decompressing unit.

With reference to a flowchart of FIG. 12, processing in the image decompressing unit 109 including the above components will be described. The DMAC 301 reads, on a packet basis, compressed data stored in the memory 105 and stores the read compressed data in the packet buffer 302 (S1201). The header analyzing unit 303 reads the header information in the packet data stored in the packet buffer 302 and analyzes the value of the two-color flag (S1202) to determine whether or not the value of the two-color flag is 1 (S1203). If it is determined that the value of the two-color flag is 1, the second-color color data generating unit 304 generates the color data on the second color for the packet and stores the generated color data in a color data storage section for the second, third, and fourth colors in the packet buffer 302 (S1204).

With reference to a flowchart of FIG. 13, the decompression processing for the color data on the second color in the second-color color data generating unit 304 will be described in detail. The second-color color data generating unit 304 reads the two representative color data items for reference held on a tile basis from the packet buffer 302 (S1301). One piece is taken as a processing target, and the pattern flag and the color data on the first color of the processing target piece are read from the packet buffer 302 (S1302). The read pattern flag is analyzed (S1303) to determine whether or not the piece consists of two colors (S1304). If it is determined that the piece consists of two colors, a comparison is made between the color data on the first color of the piece and the two representative color data items for reference, which have already been read (S1305). At this point, one of the representative color data items for reference matches the color data on the first color of the processing target piece, whereas the other representative color data item for reference does not match the color data on the first color of the processing target piece.

This comparison can inevitably determine a representative color for reference that is different from the color data on the first color (S1306). This different representative color for reference is stored as the second color of the piece in the color data storage section for the second color in the packet buffer 302 (S1307). For example, if the representative colors for reference in the tile are white and black, and the first color of the processing target piece is black, then the second color of the piece is determined to be white, which is stored in the color data storage section for the second color in the packet buffer 302. Thus, in this embodiment, the color data on the second color for each piece can be determined based on the representative colors for reference on a tile basis and based on the color data on the first color of the piece.

It is determined whether or not the color data on the second color has been generated for all the pieces in the packet data stored in the packet buffer (S1308). If the decompression processing has not been finished for all the pieces, the process transitions to S1302 to proceed to the decompression processing of the color data on the second color for the next processing target piece. If the decompression processing has been finished for all the pieces, the processing by the second-color color data generating unit 304 terminates.

If it is determined in above S1304 that the piece does not consist of two colors, the piece consists of one color. Then, the color data for the second color for this piece does not need to be generated, so that the process transitions to S1308 to repeat the above-described processing.

In this manner, the second-color color data generating unit 304 generates the color data on the second color of the packet data stored in the packet buffer 302.

Returning to FIG. 12, in S1205, the decompression processing is performed for each piece. Specifically, the pattern flag of the piece is interpreted to compute the number of colors in the piece. In addition to the color data on the first color, the color data on the second, third, and fourth colors is read depending on the number of colors. The color data on the first color as well as the second, third, and fourth colors are arranged again according to the color data arrangement pattern (FIG. 5) predefined for the pattern flag. It is determined whether or not all the pieces in the packet data have been decompressed (S1206). If not all the pieces have been decompressed, the process transitions to S1205 to perform the decompression processing for the next piece. If all the pieces have been decompressed, the decompressed packet data is transferred to the image processing unit 110 (S1207).

By applying the above processing to all the packet data of one page, the decompression processing is performed for the image data of the entire page.

According to this embodiment, savings in memory capacity, HDD capacity, and system bus bandwidth can be realized with the relatively simple compression and decompression schemes. In addition, as illustrated in FIGS. 10A and 10B, the color data storage section for the first color and the color data storage section for the second color store RGB color data. Accordingly, in performing image processing such as color replacement, the color data remaining in its compressed state can be processed. Particularly, for a tile image that consists of two colors, the data on the second color is replaced with the two representative color data items for reference, as shown in FIG. 10B. This allows further reduction of processing load in performing image processing for the color data.

In this embodiment, the patterns indicating the color data arrangements correspond to the pattern flags as shown in FIG. 5. However, the present invention is not limited to this. For example, the patterns indicating the color data arrangements may correspond to the pattern flags so that the pixel value of the lower-right pixel in the piece is the first color.

This embodiment has been described assuming a piece of a size of 2×2 pixels and a tile of a size of 32×32 pixels. However, this is not limiting. For example, a tile may be of a size of 64×64 pixels. Although the description of the compression has taken image data with 8-bit RGB values as an example, data in the CMYK color space or gray-scale data, or data with pixel values other than 8-bit values may be employed.

According to the present invention, the compression rate in image compression can be improved. Also, redundant color data on representative colors for reference can be deleted, enabling further compression of image data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-128273, filed Jun. 3, 2010, which is hereby incorporated by reference herein in its entirety.

What is claimed is:

1. An image processing apparatus, comprising:
a dividing unit that divides a tile image including a predetermined number of pixels into pieces of a size of 2×2 pixels each;
an identifying unit that identifies a pattern flag indicating an arrangement pattern of color data contained in each piece by sequentially taking each piece divided by said dividing unit as a processing target and comparing the color data of each pixel in the processing target piece, and identifies first color data and color data other than the first color data in each piece, the first color data being color data corresponding to a pixel at a predefined position in each piece;
a determining unit that determines whether or not all the pieces, except for a piece consisting of the same color, included in the tile image consist of same two colors; and
a generating unit that generates packet data including the pattern flag, the color data on the first color in each piece, and representative colors for reference in the tile image, if said determining unit determines that all the pieces, except for a piece consisting of the same color, included in the tile image consist of same two colors, the representative colors for reference in the tile image being the same two colors.

2. The apparatus according to claim 1, wherein if said determining unit determines that not all the pieces, except for a piece consisting of the same color, included in the tile image consist of same two colors, said generating unit generates packet data including the pattern flag, the color data on the first color in each piece, and the color data other than the first color data in each piece.

3. The apparatus according to claim 1, wherein if said determining unit determines that all the pieces, except for a piece consisting of the same color, included in the tile image consist of same two colors, said generating unit generates packet data including the pattern flag, the color data on the first color in each piece, and the representative colors for reference in the tile image by replacing the color data other than the first color data in each piece with the representative colors for reference.

4. The apparatus according to claim 1, wherein header information of the packet data includes information indicating whether or not the packet data includes the representative colors for reference in the tile image.

5. The apparatus according to claim 1, further comprising a unit that divides image data of one page into tile images each including the predetermined number of pixels, wherein
said generating unit generates the packet data for each of the divided tile images.

6. The apparatus according to claim 1, wherein the tile image is of a size of 32×32 pixels or 64×64 pixels.

7. An image processing method, comprising:
a dividing step of dividing a tile image including a predetermined number of pixels into pieces of a size of 2×2 pixels each;
an identifying step of identifying a pattern flag indicating an arrangement pattern of color data contained in each piece by sequentially taking each piece divided in said dividing step as a processing target and comparing the color data of each pixel in the processing target piece, and identifying first color data and color data other than the first color data in each piece, the first color data being color data corresponding to a pixel at a predefined position in each piece;
a determining step of determining whether or not all the pieces, except for a piece consisting of the same color, included in the tile image consist of same two colors; and
a generating step for generating packet data including the pattern flag, the color data on the first color in each piece, and representative colors for reference in the tile image, if it is determined in said determining step that all the pieces, except for a piece consisting of the same color, included in the tile image consist of two colors, the representative colors for reference in the tile image being the same two colors.

8. A computer-readable recording medium having recorded therein a program for causing a computer to perform the steps of the image processing method according to claim 7.

* * * * *